(12) United States Patent
Shih

(10) Patent No.: US 7,593,745 B2
(45) Date of Patent: Sep. 22, 2009

(54) METHOD FOR OPERATING WIRELESS LOCAL AREA NETWORK CARDS IN A POWER-SAVING MODE

(75) Inventor: Yung-Cheng Shih, Chang-Hua Hsien (TW)

(73) Assignee: Faraday Technology Corp., Hsin-Chu (TW)

( * ) Notice: Subject to any disclaimer, the term of this patent is extended or adjusted under 35 U.S.C. 154(b) by 594 days.

(21) Appl. No.: 10/905,464

(22) Filed: Jan. 5, 2005

(65) Prior Publication Data

US 2006/0148534 A1    Jul. 6, 2006

(51) Int. Cl.
*H04B 7/00* (2006.01)
(52) U.S. Cl. ............... 455/522; 455/432.1; 455/574
(58) Field of Classification Search .......... 455/522
See application file for complete search history.

(56) References Cited

U.S. PATENT DOCUMENTS 7,085,595 B2 * 8/2006 Kitchin ................ 455/574
7,289,804 B2 * 10/2007 Kim ................... 455/432.1

* cited by examiner

*Primary Examiner*—Yuwen Pan
*Assistant Examiner*—Ajibola Akinyemi
(74) *Attorney, Agent, or Firm*—Winston Hsu

(57) ABSTRACT

A method for a wireless access point for operating WLAN cards in a power-saving mode in a wireless communication system. The method includes: (a) storing data to be transmitted to the WLAN cards in the wireless access point of the wireless communication system; (b) receiving aging times of the WLAN cards according to durations of the WLAN cards waiting for receiving the data stored in the wireless access point; (c) when the aging times are smaller than a default, comparing unit-data-transmission amounts of the WLAN cards with the data stored in the wireless access point corresponding to the WLAN cards; and (d) when all the data stored in the wireless access point corresponding to the WLAN cards are less than the unit-data-transmission amounts of the WLAN cards, sequentially transmitting the data stored in the wireless access point corresponding to the WLAN cards according to a WLAN-card adding rule.

14 Claims, 3 Drawing Sheets

METHOD FOR OPERATING WIRELESS LOCAL AREA NETWORK CARDS IN A POWER-SAVING MODE

BACKGROUND OF INVENTION

1. Field of the Invention

The present invention provides a method for a wireless access point for operating wireless local area network cards in a power-saving mode in a wireless communication system, and more particularly, a method for the wireless access point for operating the wireless local area network cards in the power-saving mode by controlling a traffic indication map of a beacon frame.

2. Description of the Prior Art

Recently, wireless communication has rapidly developed as digital and IC technologies change with each passing day. After a wireless communication protocol is already decided, a wireless local area network, or WLAN, scheme will mature. The WLAN has too many advantages to enumerate, but compared to a conventional LAN (local area network), the WLAN is more complicated.

For example, the IEEE 802.11 protocol includes a physical layer and a medium access control layer, or MAC layer. The physical layer is to provide each node in a network the ability to transmit data, while the MAC layer controls access between each station and the network. The MAC layer in IEEE 802.11 provides two protocols: distribution coordination function, or DCF, and point coordination function, or PCF. The PCF cooperates with the DCF operation via a polling method; that is, a point coordinator decides the timings of each station's transmission according to a polling list. The DCF controls the access according to a carrier sense multiple access with collision avoidance protocol, or CSMA/CA protocol. Basically, the DCF is to prevent the waiting stations from colliding with each other when competing for a channel, or a medium, when the channel changes from busy to idle state. With the DCF, the stations have to detect whether the medium is idle or not by power detection or virtual detection before transmitting a frame. If the medium is idle, each station is supposed to wait for a duration called the DCF inter-frame space, or DIFS, select a random time for initializing a backoff timer, and transmit a frame if the backoff timer counts to 0 without detecting another station's broadcast, otherwise defer the frame and perform the backoff procedure again. A contention window is an integer between 7 and 255, which is to decide a random waiting duration for each station. Only if the medium is idle does the backoff timer count down, otherwise the backoff timer freezes until the medium is idle for longer than a DIFS. If a collision happens or a transmitter does not receive a response from a receiver after a short inter-frame space, or SIFS, the transmitter re-transmits a frame for the receiver. In this situation, the values of the contention windows of the stations having collisions are doubled, and the stations perform the backoff procedures again until the frame is transmitted.

A WLAN is usually designed for mobile communication applications where power consumption is a problem. Therefore, the wireless communication protocol provides a power management scheme for implementing a power-saving operation. For example, in IEEE 802.11 protocol, each WLAN card, or station, can operate in two power modes: an active mode and a power-saving mode. When operating in the active mode, the WLAN card is under a full power condition, meaning that the WLAN card at full power condition can receive or transmit frames at any time. When in the power-saving mode, a wireless access point recognizes paths of WLAN cards operating in the power-saving mode, and stores data to be transmitted to the WLAN cards. Moreover, a WLAN card operating in the power-saving mode can be in a sleep state or an awake state. Most of the time, the WLAN card operating in power-saving mode is in the sleep state, meaning that the WLAN card does not perform any operation, but only enters the awake state for some intervals for listening to a beacon frame, and for receiving data stored in the wireless access point if necessary.

Generally, the wireless access point outputs beacon frames continuously, where a beacon frame is about 50 bytes long. A common frame header and a cyclic redundancy check occupy almost half of the beacon frame. The common frame header includes the MAC addresses of a source and a destination, as well as other information. The main content of the beacon frame is the data between the common frame header and the cyclic redundancy check, including: a beacon interval and a traffic indication map (TIM). If a WLAN card wants to enter the power-saving mode, the WLAN card has to transmit a power-saving request to the wireless access point. After the wireless access point receives the request and returns a response to the WLAN card, the WLAN card enters the power-saving mode. Once the WLAN card is in the power-saving mode, the WLAN card enters the awake state to listen to the beacon at every beacon interval, while the TIM in the beacon indicates if there is data for the WLAN card in the wireless access point. In short, the beacon interval indicates when the WLAN card operating in the power-saving mode should wake up to listen to the beacon, while the wireless access point uses the TIM for indicating whether there is any data to be transmitted to the WLAN card or not. After receiving the beacon frame, the WLAN card checks a partial virtual bitmap of the TIM, so as to determine if there is data to be received. If any such data exists, the WLAN card transmits a power-saving poll frame, or PS-Poll frame, to the wireless access point for informing the wireless access point that the WLAN card is ready to receive the data. As a result, the WLAN card changes states to operate in the awake state, which is the same as the active mode, and to contest or back off with other WLAN cards until the data is received.

Please refer to FIG. 1, which illustrates a schematic diagram of data flow between a prior art wireless access point and WLAN cards operating in the power-saving mode. Suppose that there are five WLAN cards 20, 22, 24, 26, and 28 operating in the power-saving mode within a transmission range of the wireless access point, and data 10, 12, 14, 16, and 18 stored in the wireless access point corresponding to the WLAN cards 20, 22, 24, 26, and 28 respectively. So, a partial virtual bitmap in a TIM of a beacon frame outputted from the wireless access point will indicate that WLAN cards 20, 22, 24, 26, and 28 need to receive the data 10, 12, 14, 16, and 18. The WLAN cards 20, 22, 24, 26, and 28 will then contest or back off with other WLAN cards until each one's data is received. However, until receiving data, the WLAN cards 20, 22, 24, 26, and 28 must remain in the awake state all the time. For example, in FIG. 1, before receiving the data 10, the WLAN card 20 must stay in the awake state, meaning that the WLAN card 20 consumes the same power as it uses in the active mode, until the data 10 is transmitted to the WLAN card 20 completely.

In short, when a WLAN card operating in the power-saving mode has data to be received, the prior art wireless access point sets a bit of the TIM corresponding to the WLAN card for indicating that the WLAN card should enter the awake state, so that before the data is received, the WLAN card should stay in the awake state. Moreover, because each WLAN card contests for a channel in a network, some WLAN cards may consume power all the time if they cannot get any channel in the network. For example, in FIG. 1, after the WLAN card 20 receives a first data segment of the data 10, the WLAN card 20 cannot grab any channels to receive a second data segment of the data 10 for four beacon intervals. However, during these four beacon intervals, the WLAN card 20 stays in the awake state, and so keeps consuming power.

Certainly, a WLAN card operating in the power-saving mode can conserve electric power. However, the WLAN card has to contest with other WLAN cards for a channel to receive data if need be, and until the data is received completely, the WLAN card must keep in the awake state, consuming the same power as in the active mode. Therefore, the WLAN card consumes very low power in the sleep state of the power-saving mode, but once data is to be received by the WLAN card, the WLAN card must stay in the awake state until the data is received. As a result, the WLAN card operating in the power-saving mode spends most of its time waiting to receive data, especially with a large data size.

SUMMARY OF INVENTION

It is therefore a primary objective of the claimed invention to provide a method for a wireless access point for operating wireless local area network cards in a power-saving mode in a wireless communication system.

According to the claimed invention, the present invention discloses a method for a wireless access point to operate wireless local area network cards in a power-saving mode in a wireless communication system. The method includes: (a) storing data to be transmitted to the wireless local area network cards, or WLAN cards, operating in the power-saving mode in the wireless access point of the wireless communication system; (b) receiving aging times of the WLAN cards operating in power-saving mode according to durations of the WLAN cards waiting for receiving the data stored in the wireless access point; (c) when the aging times of the WLAN cards operating in power-saving mode are smaller than a default, comparing unit-data-transmission amounts of the WLAN cards with the data stored in the wireless access point corresponding to the WLAN cards operating in power-saving mode in step (a); and (d) when sizes of all the data stored in the wireless access point corresponding to the WLAN cards operating in power-saving mode are less than the unit-data-transmission amounts of the WLAN cards, sequentially transmitting the data stored in the wireless access point corresponding to the WLAN cards operating in power-saving mode in step (a) according to a WLAN-card adding rule. Moreover, following step (b), the present invention provides another step as follow: when an aging time of a WLAN card operating in power-saving mode is greater than a default, transmitting data corresponding to the WLAN card in the wireless access point. Furthermore, following step (c), the present invention provides steps as follow: when a size of a data stored in the wireless access point corresponding to a WLAN card operating in power-saving mode is greater than the unit-data-transmission amount of the WLAN card, dividing the data into a plurality of blocks whose maximum volume is equal to or less than the unit-data-transmission amount, so as to transmit the plurality of blocks to the WLAN card sequentially according to a WLAN-card adding rule.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
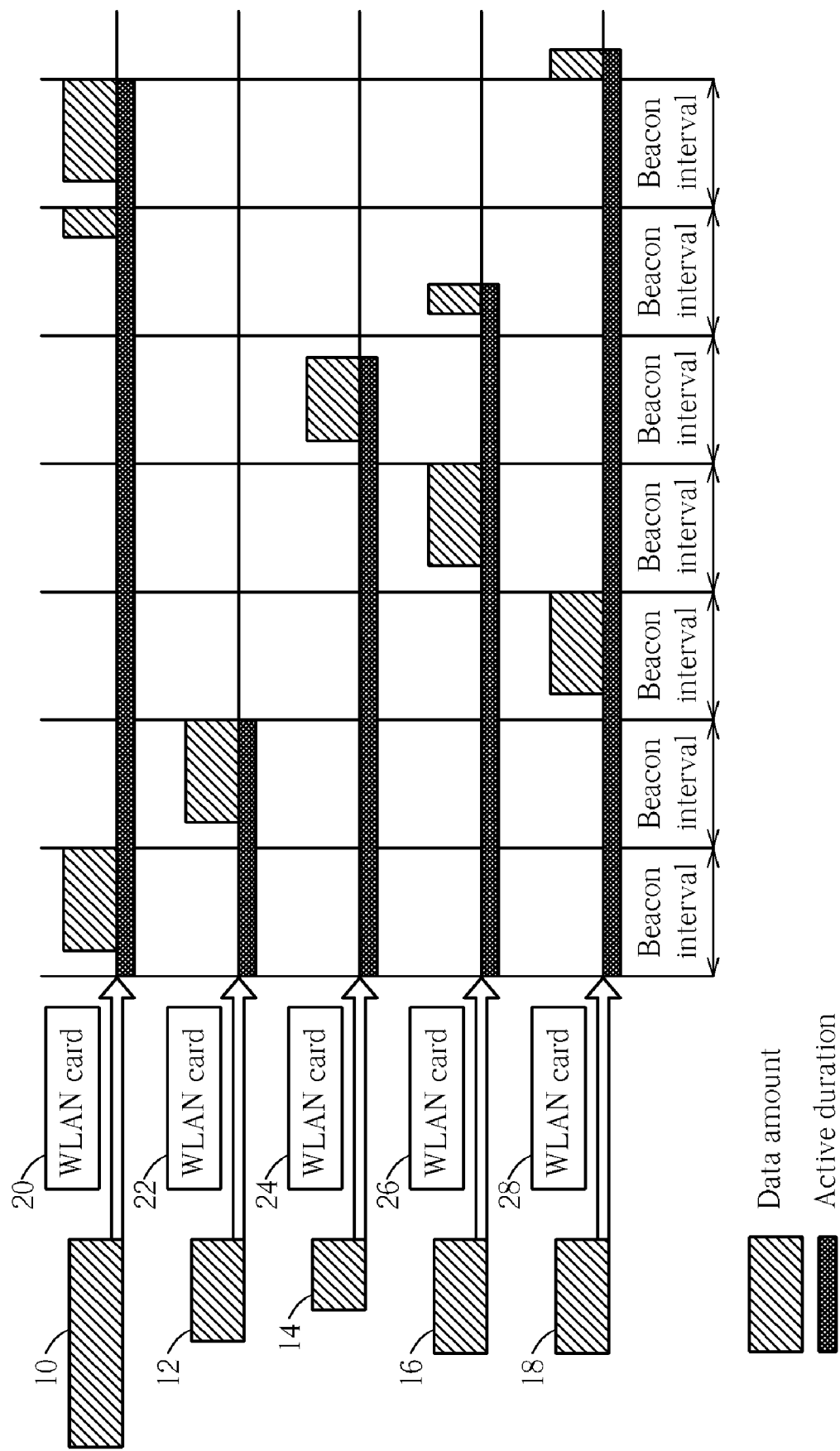
FIG. 1 illustrates a schematic diagram of data flow between a prior art wireless access point and a plurality of WLAN cards operating in a power-saving mode.
Figure 2:
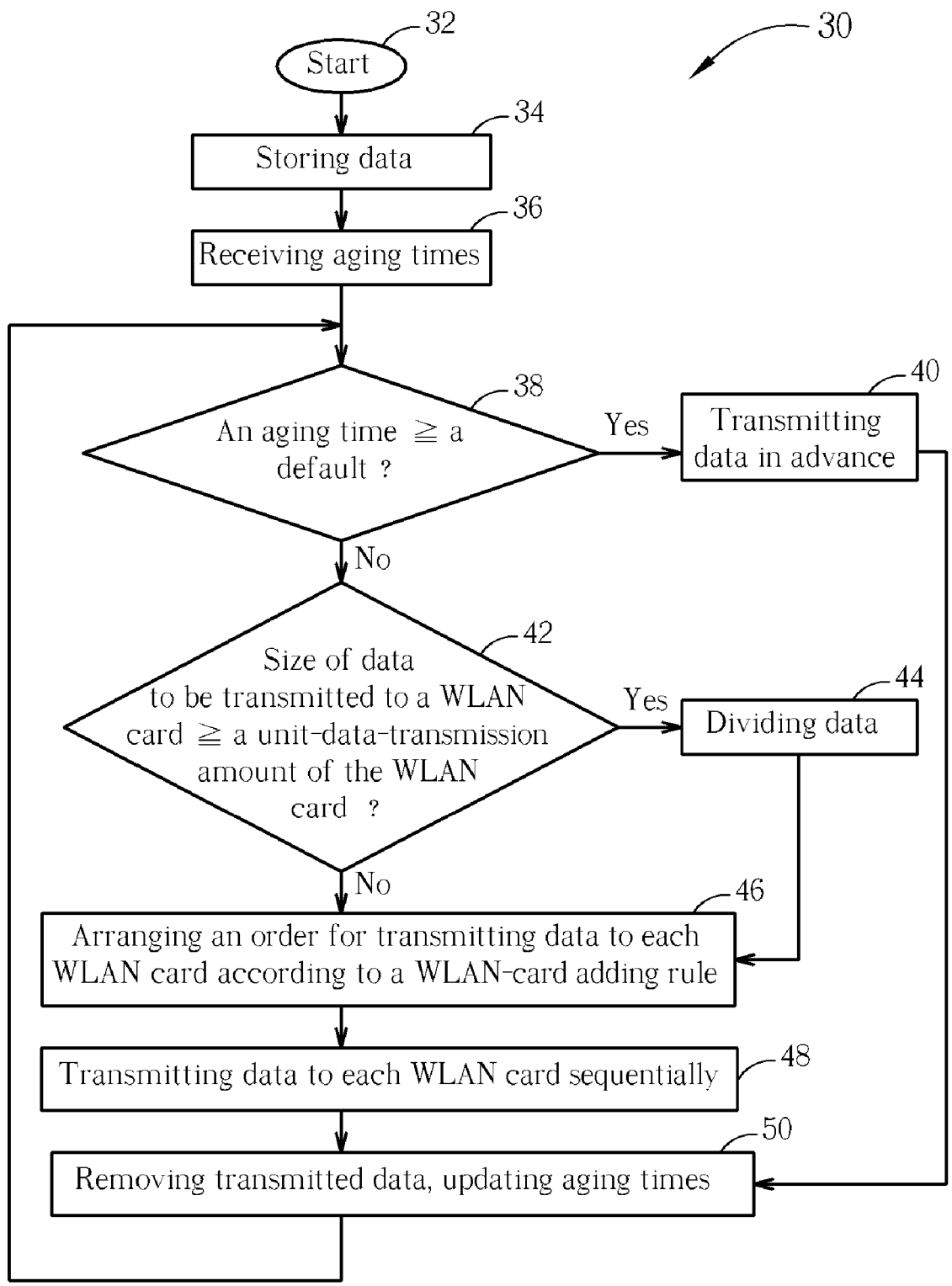
FIG. 2 illustrates a flowchart of the operation of a power-saving process of a wireless access point of a wireless communication system in accordance with the present invention.

Please refer to FIG. 2, which illustrates a flowchart of a power-saving process 30 of a wireless access point of a wireless communication system in accordance with the present invention. The process 30 includes following steps:

Step 32: start. When a WLAN card transmits a request to enter a power-saving mode to the wireless access point, the wireless access point returns a response to the WLAN card after receiving the request. After that, the WLAN card operates in the power-saving mode, and the wireless access point starts to perform the process.

Step 34: storing data. The wireless access point knows the paths of WLAN cards operating in the power-saving mode, and stores data to be transmitted to the WLAN cards.

Step 36: receiving aging times. The wireless access point calculates the aging times of the WLAN cards operating in the power-saving mode according to durations of the WLAN cards waiting for receiving the data.

Step 38: determining whether each of the aging times of the WLAN cards is greater than a default, and proceeding to step 40 if an aging time of a WLAN card is greater than or equals the default, or proceeding to step 42 if all the aging times are smaller than the default.

Step 40: transmitting data in advance, and proceeding to step 50. The wireless access point transmits data for a WLAN card having an aging time greater than or equaling the default. In this case, the wireless access point sets a bit corresponding to the WLAN card in a traffic indication map, or TIM, of a beacon frame to an enabled status, and sets other bits corresponding to other WLAN cards to disabled statuses.

Step 42: determining whether the data to be transmitted to the WLAN cards are greater than unit-data-transmission amounts of the WLAN cards or not, and proceeding to step 44 if a data to be transmitted to a WLAN card is greater than a unit-data-transmission amount of the WLAN card, or proceeding to step 46 if all the data to be transmitted to the WLAN cards are smaller than the unit-data-transmission amounts of the WLAN cards.

Step 44: dividing data. In this case, the wireless access point divides data to be transmitted to a WLAN card into a plurality of blocks whose maximum volume is equal to or less than a unit-data-transmission amount of the WLAN card.

Step 46: arranging an order for transmitting data to each WLAN card according to a WLAN-card adding rule. The WLAN-card adding rule can be set as the larger data a WLAN card has, the higher priority the WLAN card is, or vice versa, for example.

Step 48: transmitting data to each WLAN card sequentially. According to the order determined in step 46, the wireless access point sets bits corresponding to the WLAN cards which need to receive data within a beacon interval, in the TIM of the beacon frame, to the enabled statuses, and sets bits corresponding to other WLAN cards which do not need to receive data within the beacon interval to disabled statuses.

Step 50: removing transmitted data, updating aging times, and going back to step 38. The wireless access point removes data that has been transmitted to a WLAN card, and resets an aging time of said WLAN card.

In short, according to the present invention process 30, after the power-saving operation starts, the wireless access point stores data to be transmitted to the WLAN cards. Then, according to an aging time of each WLAN card, the wireless access point transmits data to a given WLAN card first if the WLAN card's aging time is greater than or equals the default, so the wireless access point sets a bit in the TIM corresponding to the WLAN card to the enabled status, and the other bits in the TIM to disabled statuses; after receiving the TIM, the WLAN card enters the awake state to receive data, while the other WLAN cards remain in the sleep state. Moreover, when all the aging times are smaller than the default, the present invention determines whether data to be transmitted to the WLAN cards are greater than unit-data-transmission amounts of the WLAN cards or not; if data to be transmitted to a WLAN card is greater than a unit-data-transmission limit of the WLAN card, the present invention divides data to be transmitted to a WLAN card into a plurality of blocks whose maximum volume is less than or equal to a unit-data-transmission limit of the WLAN card, otherwise the present invention arranges an order for transmitting data to each WLAN card according to the WLAN-card adding rule. According to the order, the wireless access point sets bits in the TIM of the beacon frame corresponding to the WLAN cards necessary to receive data within a beacon interval to the enabled status, and sets bits corresponding to other WLAN cards which do not need to receive data within the beacon interval to the disabled status. Finally, the wireless access point removes data that has already been transmitted to a WLAN card, and resets an aging time of the WLAN card.

As to a procedure for determining the unit-data-transmission amount in step 42, please refer to the following description. First, according to a product of a beacon interval of the wireless access point and a listening interval of a WLAN card, the wireless access point calculates a transmission interval of the WLAN card. The listening interval means how many beacon intervals the WLAN card wakes up to listen to a beacon frame provided by the wireless access point. For example, when the listening interval of the WLAN card is 1, the WLAN card listens to the beacon frame at every beacon interval. Then, according to a time summation of a PS-poll frame (power-saving poll frame), a backoff frame, a SIFS (Short Inter Frame Space, SIFS), and a DIFS (Distribution Coordination Function Inter Frame Space, DIFS), the wireless access point calculates a transmission delay duration of the wireless access point. Finally, according to a product of a transmission rate of the wireless access point and a difference between the transmission interval of the WLAN card and the transmission delay duration of the wireless access point, the wireless access point calculates the unit-data-transmission amount of the WLAN card.

As mentioned above, when all the aging times of the WLAN cards in the wireless communication system are smaller than the default, and when data to be transmitted to a WLAN card is larger than the unit-data-transmission amount of the WLAN card, the present invention process 30 divides the data into a plurality of blocks whose maximum volume is less than or equal to the unit-data-transmission limit, then transmits the blocks and other data to each of the WLAN cards sequentially. Moreover, when data to be transmitted to each of the WLAN cards are smaller than or equal the unit-data-transmission amount, the present invention transmits the data according to the WLAN-card adding rule. The WLAN-card adding rule can be set such that a WLAN card having the largest amount of waiting data has a higher priority than other WLAN cards, or by other methods. When the wireless access point can transmit data to more than one WLAN card within a beacon interval, the wireless access point sets multiple bits of the TIM to the enabled status sequentially according to the WLAN-card adding rule. Finally, after the data stored in the wireless access point has been transmitted to a WLAN card, the data is removed, and the aging time of the WLAN card is reset.

Therefore, the present invention process 30 sets a TIM bit corresponding to a WLAN card necessary to receive data to the enabled status, and sets other TIM bits to the disabled status. As mentioned above, the TIM in the beacon frame is to indicate which WLAN cards should enter the awake state for receiving data, while the present invention sets the TIM corresponding to a WLAN card to the enabled status only when the WLAN card needs to receive data, so that the WLAN card does not have to contest against other WLAN cards.

In comparison, the prior art sets TIM bits corresponding to all the WLAN cards having data to be received to the enabled status at the same time, so the WLAN cards must contest with each other or back off all the time. On the other hand, the present invention process 30 sets the TIM bits corresponding to the WLAN cards having data to be received to the enabled status in turns, so that when one of the WLAN cards is about to be sent data, only a TIM bit corresponding to that WLAN card changes to the enabled status. Therefore, according to the present invention, the WLAN cards do not need to contest or back off.

Figure 3:
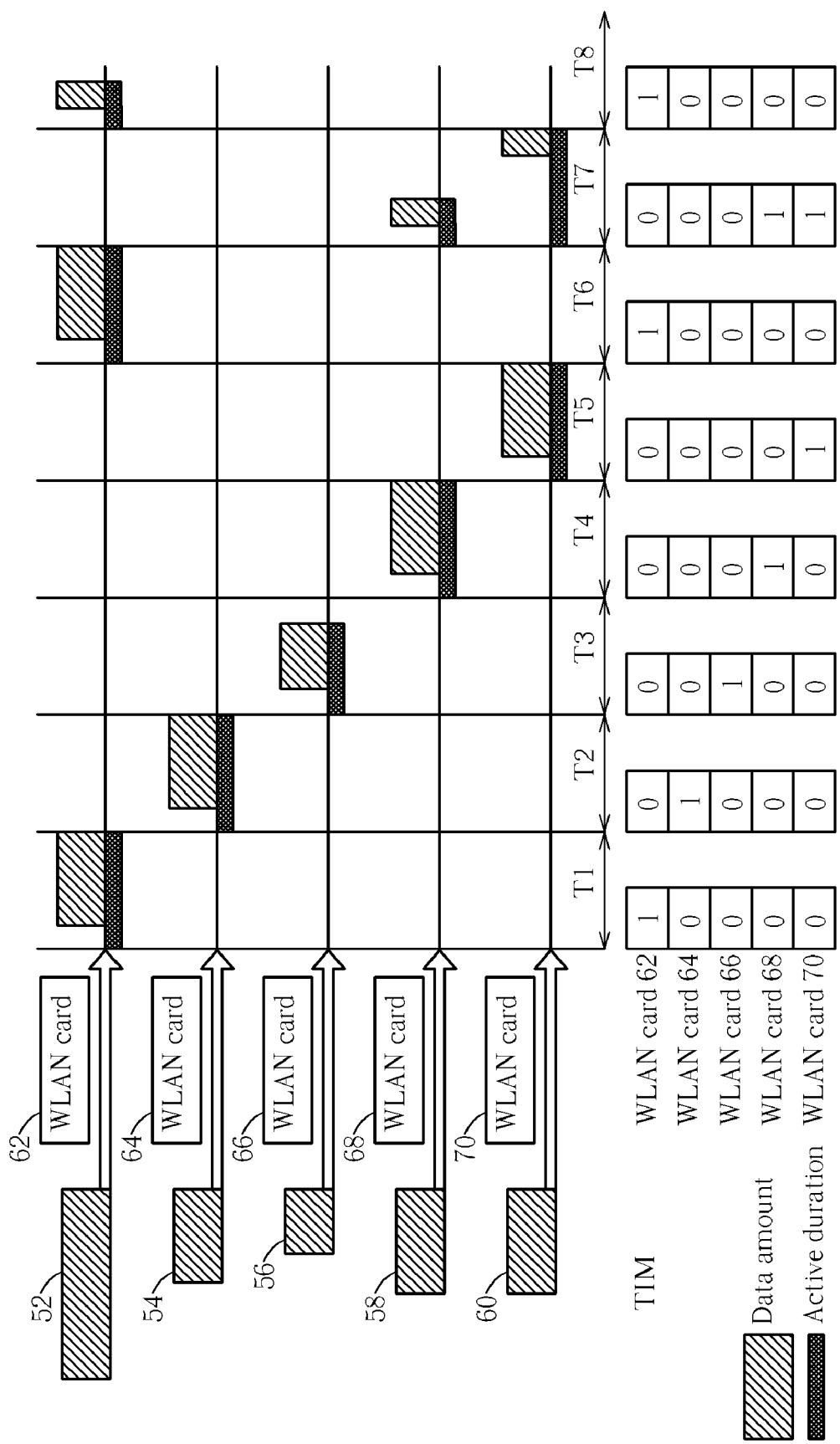
FIG. 3 illustrates a schematic diagram of data flow between a wireless access point and a plurality of WLAN cards operating in a power-saving mode in accordance with the present invention.

Please refer to FIG. 3, which illustrates a schematic diagram of the data flow between a wireless access point and WLAN cards 62, 64, 66, 68, and 70 operating in the power-saving mode in accordance with the method of the present invention. The upper part of FIG. 3 illustrates the flow of data to be received by the WLAN cards 62, 64, 66, 68, and 70, and the active durations of the WLAN cards 62, 64, 66, 68, and 70, where the X-axis shows beacon intervals T1 to T8 of the wireless access point. The lower part of FIG. 3 illustrates a bitmap of the TIMs corresponding to the WLAN cards 62, 64, 66, 68, and 70 from top to bottom in each beacon frame provided by the wireless access point. Data 52, 54, 56, 58, and 60 stored in the wireless access point have to be transmitted to the WLAN cards 62, 64, 66, 68, and 70, and the listening intervals of the WLAN cards are all 1, meaning that all of the WLAN cards listen to the beacon frame at every beacon interval. This diagram illustrates the condition that aging times of the WLAN cards are smaller than a default, so when transmitting the data 52 to the WLAN card 62, the wireless access point sets a TIM bit corresponding to the WLAN card 62 to 1 (or to the enabled status), and sets other bits to 0 (or to the disabled status). Moreover, since the data 52 is larger than a unit-data-transmission amount of the WLAN card 62, the data 52 is divided into three blocks, and the blocks are transmitted to the WLAN card 62 in the beacon intervals T1, T6, and T8 by turns. Notice that remaining data to be transmitted to the WLAN cards 68 and 70 can be transmitted in the beacon interval T7, so the wireless access point sets both TIM bits corresponding to the WLAN cards 68 and 70 to 1 according to the WLAN-card adding rule.

In FIG. 3, each WLAN card enters the awake state only when it is necessary to receive data. For example, in the beacon interval T1, although there are also data to be transmitted to the WLAN cards 64, 66, 68, and 70, the present invention only sets the TIM bit corresponding to the WLAN card 62 to 1. Therefore, the WLAN card 62 enters the awake state to receive data, while the WLAN cards 64, 66, 68, and 70 are still in the sleep state because their corresponding TIM bits are 0. Similarly, in the beacon interval T2, the present invention sets the TIM bit corresponding to the WLAN card 64 to 1, and the other bits to 0. Therefore, the WLAN cards 62, 66, 68, and 70 will not remain in the awake state for receiving data but instead go back to the sleep state. Notice that the data 52, 58, and 60 are larger than the unit-data-transmission amounts of the WLAN cards 62, 68, and 70, so the data 52, 58, and 60 are divided into two or three blocks, as necessary for each segment to be smaller than the corresponding WLAN cards' unit-data transmission amounts, and the wireless access point awakens the WLAN cards 62, 68, and 70 only when the WLAN cards 62, 68, and 70 should receive one of their respective blocks. Taking the WLAN card 62 as an example, the WLAN card 62 enters the awake state to receive data only in the beacon intervals T1, T6, and T8, while in other beacon intervals, the WLAN card 62 is in the sleep state according to the TIM bits. As a result, the wireless access point decreases power consumption of the WLAN cards operating in the power-saving mode.

In comparison, according to the prior art, each WLAN card operating in the power-saving mode contests against each other for a chance to receive data, so that before receiving the data completely, the WLAN card stays in the awake state, which consumes the same power as in the active mode. As a result, when a prior art wireless access point transmits data to a WLAN card operating in the power-saving mode, the WLAN card stays in the awake state all the time until fully receiving its data. Meanwhile, if a WLAN card cannot get any chances to receive data, the prior art wireless access point does not have any compensation procedures for preventing the WLAN card from waiting too long and consuming too much power. On the other hand, the present invention can determine whether aging times of WLAN cards within its range are larger than a predetermined waiting time limit or not, and priority is awarded to transmit data to a WLAN card having an aging time over the limit. Moreover, the present invention controls an order of the WLAN cards entering the awake state by means of changing a bitmap of the TIM in the beacon frame. Therefore, when a WLAN card needs to receive data during a beacon interval, the present invention awakens the WLAN card, and in other beacon intervals, the WLAN card is left in the sleep state even if there is still data for the WLAN card.

In summary, when operating in the power-saving mode, whether a WLAN card enters the awake state or not is based on a TIM bit. Therefore, by controlling the TIM bit, the present invention can awaken the WLAN card only when necessary in a given beacon interval. Moreover, a prior art WLAN card does not need to change its circuit configuration in order to conform to the present invention. In addition, the present invention can transmit data to a WLAN card having an aging time over a limit first, so the WLAN card is prevented from waiting too long and decreasing efficiency. Furthermore, since each WLAN card operating in the power-saving mode is awakened only when necessary, the WLAN card consumes very little power but still conforms to the prior art configuration. Therefore, the present invention decreases power consumption and increases system efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a wireless access point for operating wireless local area network cards in a power-saving mode in a wireless communication system, the method comprising following steps:
    (a) storing data to be transmitted to the wireless local area network cards, or WLAN cards, operating in the power-saving mode in the wireless access point of the wireless communication system;
    (b) receiving aging times of the WLAN cards operating in power-saving mode according to durations of the WLAN cards waiting for receiving the data stored in the wireless access point;
    (c) when the aging times of the WLAN cards operating in power-saving mode are smaller than a default, comparing unit-data-transmission amounts of the WLAN cards with the data stored in the wireless access point corresponding to the WLAN cards operating in power-saving mode in step (a); and
    (d) when sizes of all the data stored in the wireless access point corresponding to the WLAN cards operating in power-saving mode are less than the unit-data-transmission amounts of the WLAN cards, sequentially transmitting the data stored in the wireless access point corresponding to the WLAN cards operating in power-saving mode in step (a) according to a WLAN-card adding rule.

2. The method of claim 1, wherein in step (c), each unit-data-transmission amount of the WLAN card is calculated according to a product of a transmission speed of the wireless access point and a difference between a transmission interval of the WLAN card and a transmission delay duration of the wireless access point.

3. The method of claim 2, wherein the transmission interval of the WLAN card is calculated according to a product of a beacon interval of the wireless access point and a listening interval of the WLAN card.

4. The method of claim 1, wherein in step (d), the WLAN-card adding rule determines a priority of the WLAN cards according to the data stored in the wireless access point for sequentially transmitting the data stored in the wireless access point corresponding to the WLAN cards operating in power-saving mode in step (a), wherein the priority of a given WLAN card is determined according to the size of data stored in the wireless access point corresponding to the given WLAN card.

5. The method of claim 1 further comprising step (e) setting a bit of a traffic indication map, or TIM, in a beacon corresponding to a to-be-transmitted WLAN card to an enabled status, and setting other bits of the TIM in the beacon to disabled status.

6. The method of claim 2, wherein the transmission delay duration of the wireless access point is calculated according to a summation of periods of a power-saving-poll frame, or PS-poll frame, a backoff frame, and a short interframe space, or SIFS.

7. The method of claim 6 further comprising calculating the transmission delay duration according to a summation of periods of a distribution coordination function interframe space, or DIFS, the PS-poll frame, the backoff frame, and the SIFS.

8. A method for a wireless access point for operating wireless local area network cards in a power-saving mode in a wireless communication system, the method comprising following steps:

(a) storing data to be transmitted to the wireless local area network cards, or WLAN cards, operating in the power-saving mode in the wireless access point of the wireless communication system;

(b) receiving aging times of the WLAN cards operating in power-saving mode according to durations of the WLAN cards waiting for receiving the data stored in the wireless access point;

(c) when the aging times of the WLAN cards operating in power-saving mode are smaller than a default, comparing unit-data-transmission amounts of the WLAN cards with the data stored in the wireless access point corresponding to the WLAN cards operating in power-saving mode in step (a); and (d) when a size of a data stored in the wireless access point corresponding to a WLAN card operating in power-saving mode is greater than the unit-data-transmission amount of the WLAN card, dividing the data into a plurality of blocks whose maximum volume is equal to or less than the unit-data-transmission amount, so as to transmit the plurality of blocks to the WLAN card sequentially according to a WLAN-card adding rule.

9. The method of claim 8, wherein in step (c), each unit-data-transmission amount of the WLAN card is calculated according to a product of a transmission speed of the wireless access point and a difference between a transmission interval of the WLAN card and a transmission delay duration of the wireless access point.

10. The method of claim 9, wherein the transmission interval of the WLAN card is calculated according to a product of a beacon interval of the wireless access point and a listening interval of the WLAN card.

11. The method of claim 8 further comprising step (e) setting a bit of a traffic indication map, or TIM, in a beacon corresponding to a to-be-transmitted WLAN card to an enabled status, and setting other bits of the TIM in the beacon to disabled status.

12. The method of claim 9, wherein the transmission delay duration of the wireless access point is calculated according to a summation of periods of a power-saving-poll frame, or PS-poll frame, a backoff frame, and a short interframe space, or SIFS.

13. The method of claim 12 further comprising calculating the transmission delay duration according to a summation of periods of a distribution coordination function interframe space, or DIFS, the PS-poll frame, the backoff frame, and the SIFS.

14. The method of claim 8, wherein in step (d), the WLAN-card adding rule determines a priority of the WLAN cards according to the data stored in the wireless access point for transmitting the data stored in the wireless access point corresponding to the WLAN cards operating in power-saving mode in step (a) sequentially, wherein the priority of a given WLAN card is determined according to the size of data stored in the wireless access point corresponding to the given WLAN card.

* * * * *